Patented Sept. 29, 1942

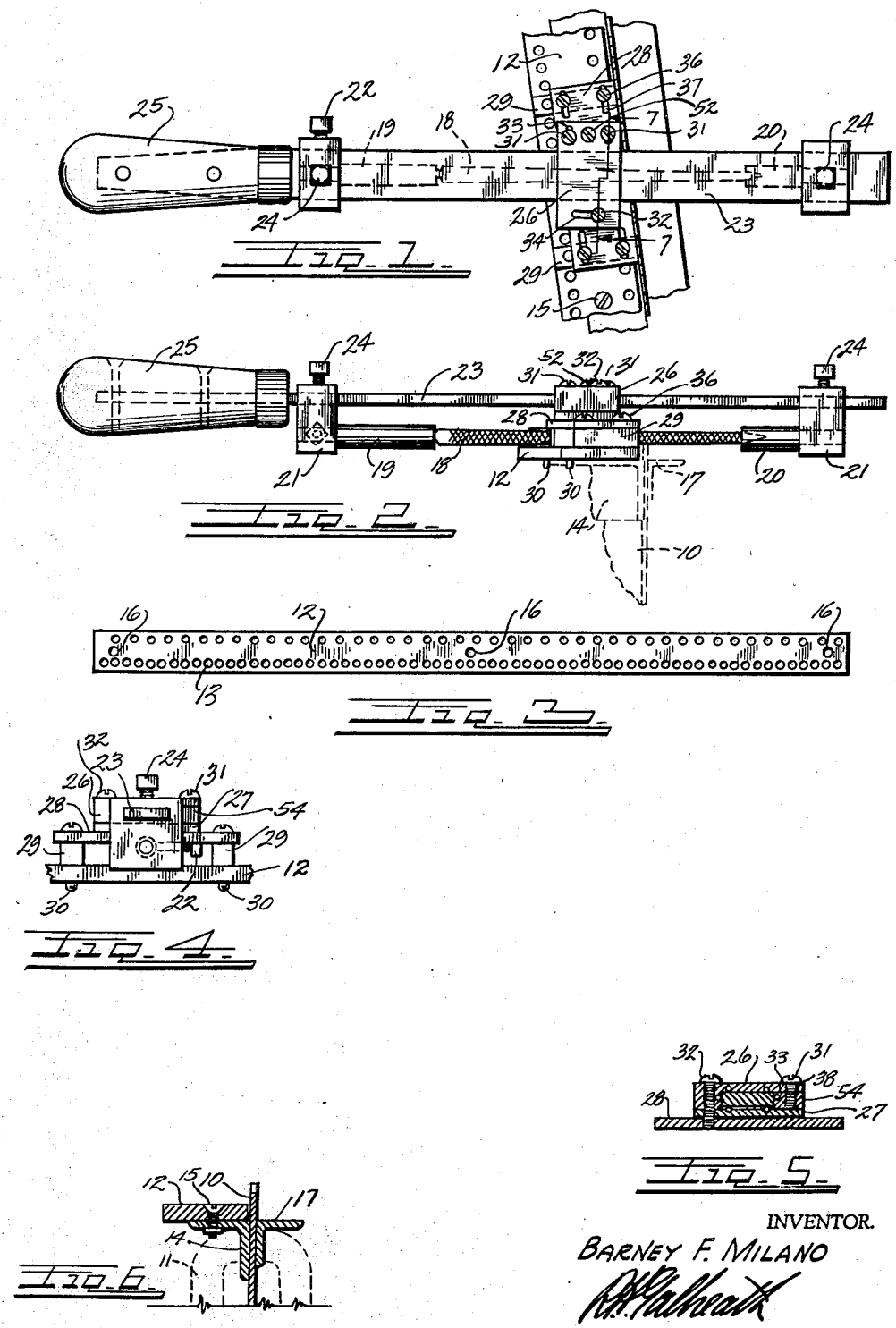

2,297,010

UNITED STATES PATENT OFFICE 2,297,010

SAW FILING DEVICE

Barney F. Milano, Pueblo, Colo.

Application November 28, 1940, Serial No. 367,503

2 Claims. (Cl. 76—33)

This invention relates to a saw sharpening device and has for its principal object the provision of a mechanism for accurately supporting and guiding a sharpening file at any desired angle with the saw in such a way that the file can only contact the saw at definite, fixed, uniformly spaced intervals so that all the teeth of the saw will be uniformly angled and uniformly spaced.

Other objects and advantages of the invention are to provide a mechanism of this character which will be quickly and easily adjustable to accommodate the different tooth spacing on different types of saws; to accommodate the different sizes and lengths of files; and which can be quickly and easily applied to any saw either by means of the usual saw filing vise or by means of an ordinary carpenter's or machinist's vise so that no special attaching mechanism will be required.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of the improved saw filing device illustrating it in place on a saw. The saw and the longitudinal supporting members are shown broken away for convenience of illustration.

Fig. 2 is a side view thereof with the position of the saw and the supporting members being shown in broken line.

Fig. 3 is a plan view of the tooth spacing bar as employed in the invention.

Fig. 4 is an end view of the file supporting structure.

Fig. 5 is a cross section through the file guide block of the invention.

Fig. 6 is a detail cross section through the spacing bar and supporting members illustrating their position on a saw and in a typical vise.

In the drawing, a saw is indicated at 10; a typical vise of any desired type, at 11; and a saw sharpening file at 18.

The invention comprises a spacing bar 12 having one or more longitudinally extending series of accurately spaced holes 13 adjacent its edges. The spacing bar illustrated in Fig. 3 has one series of relatively closely spaced holes, corresponding to the spacing of typical teeth in the usual cross cut carpenter's saw, and a second series of similar holes more widely spaced to correspond to the spacing of teeth in a carpenter's typical rip saw. The two series of holes parallel the two side edges of the bar. The spacing bar is detachably secured along a supporting angle member 14 by means of suitable bolts 15 passing through bolt holes 16 therein. A second angle supporting member 17 is provided.

The two angle supporting members are clamped against the opposite sides of the saw to hold it in alignment by means of any suitable vise, such as the vise 11. When the angle members 17 and the angle member 14 with its spacing bar 12 have been clamped along the saw the proper distance below the teeth thereof, the device is ready for use.

The filing is done by means of the usual triangular saw file 18 having any desired length. The handle extremity of the file 18 is wedged or otherwise secured in a fixed socket member 19. The tip extremity of the file is supported in a receiving socket in a second socket member 20. The outer extremities of the socket members 19 and 20 are reduced in diameter and slipped into receiving bores in two file blocks 21. The member 19 is secured in its file block 21 by means of a set screw 22 which acts to hold the file in any desired position and to prevent it from rotating.

The two file blocks 21 are adjustably mounted on a slide bar 23 terminating in a handle 25. The slide bar passes through the file blocks and the latter are secured thereon by means of suitable set screws 24. The position of the file blocks can be varied along the bar 23 to accommodate files of any given length.

The slide bar is slidably mounted in a guide block 26, the block being notched to snugly receive the bar 23, the bottom of the notch may be closed by means of a bottom plate 27 and the side of the notch is closed by means of an adjustable side block 54. The latter block is held in place by means of clamp screws 31 which are threaded into the side block 54 and which pass through slotted openings 33 in the guide block 26. By this arrangement the side block can be adjusted snugly against the bar 23 to take up any lost motion therein.

The guide block and its bottom plate 27 are adjustably attached to a supporting plate 28 which in turn is supported from the spacer bar 12 on a pair of spacing blocks 29 positioned at each side of the slide bar. Each of the blocks 29 carries a spacing pin 30 which engages in the openings 13 in the member 12.

The guide block 26 is secured to the plate 28, at one side of the bar 23 by means of a pivot screw 52 and at the other side thereof by means of a set screw 32. The screw 32 extends through an arcuately slotted hole 34 extending substantially parallel to the bar 23. The side block 54 is slotted for the passage of the pivot screw 52 so that the latter does not interfere with the adjustment of the former.

Thus, by loosening the screws 32 and 52, the bar 23 and the block 26 can be turned to any angle with reference to the bar 28, after which the two screws are again tightened to fix the block 26 at this angle.

The plate 28 is attached to the blocks 29 by means of suitable attachment screws 36 which pass through slotted openings 37 in the plate 28. By this arrangement, the position of the spacing blocks 29 can be changed to suit the spacing of either series of holes 13 so that they will accurately register with two of these holes when the file is between two teeth of the saw.

After the block 26 is positioned and set at the angle that is desired on the cutting edges of the teeth, the spacing pins 30 are placed in the proper holes 13 to position the file 18 between the first teeth of the saw. The handle 25 is then reciprocated forward and back until the file has cut the full tooth depth. It cannot cut further than the desired depth since when this depth is reached, the blocks 29 are resting against the bar 12. The entire mechanism is then raised and the spacing pins are placed in the next adjacent holes 13 and the next tooth space is similarly filed. This is continued throughout the entire length of the saw. When the entire saw has been filed in this direction, the block 26 is shifted to the opposite angle and set in position and the procedure is repeated to place the opposite bevels on the teeth.

It can be readily seen that since the spacing of the teeth depends upon the spacing of the holes 13 and since the spacing is accurately uniform, the resulting teeth will be similarly uniform.

The friction of the bar 23 through the block 26 may be relieved if desired by placing suitable bearing balls 38 in the block 26 to ride against the bar 23, as shown in Fig. 7.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A saw sharpening device comprising: a flat, elongated, spacer bar having a longitudinally extending row of uniformly spaced perforations; means for securing said bar along the toothed edge of a saw with its flat upper surface horizontal; a supporting plate; spacer blocks supporting said supporting plate on said upper surface; a pair of pins projecting downwardly from said spacer blocks into spaced apart perforations in said row; a slotted guide block pivotally mounted on said supporting plate; means for locking said block to said plate at any desired position around its pivot; a slide bar passing through the slot of said guide block and projecting from both sides thereof; a file supporting member adjustably mounted adjacent each extremity of said slide bar; a file supported at its each extremity by one of said file supporting members and extending across said spacer bar below said supporting plate and between said spacer blocks.

2. A saw sharpening device comprising: an elongated spacer bar having a longitudinally extending row of uniformly spaced receiving depressions; means for securing said bar along the toothed edge of a saw; a supporting member; projections projecting from said supporting member into spaced-apart depressions in said row; a guide block pivotally mounted on said supporting member; means for locking said block to said member at any desired position around its pivot; a slide bar passing through said block; and means for suspending a file below said bar and from the extremities thereof.

BARNEY F. MILANO.